Aug. 14, 1934.  G. F. WEATON  1,970,209

FURNACE STRUCTURE

Filed Sept. 13, 1932    3 Sheets-Sheet 1

Inventor:
George F. Weaton
By Byrnes, Townsend & Potter
Attorneys.

Aug. 14, 1934.  G. F. WEATON  1,970,209
FURNACE STRUCTURE
Filed Sept. 13, 1932   3 Sheets-Sheet 2

Inventor:
George F. Weaton
By Byrnes, Townsend & Potter
Attorneys.

Aug. 14, 1934.    G. F. WEATON    1,970,209
FURNACE STRUCTURE
Filed Sept. 13, 1932    3 Sheets-Sheet 3
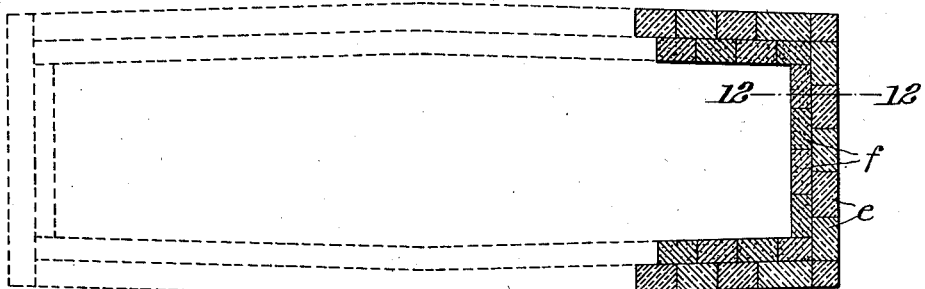
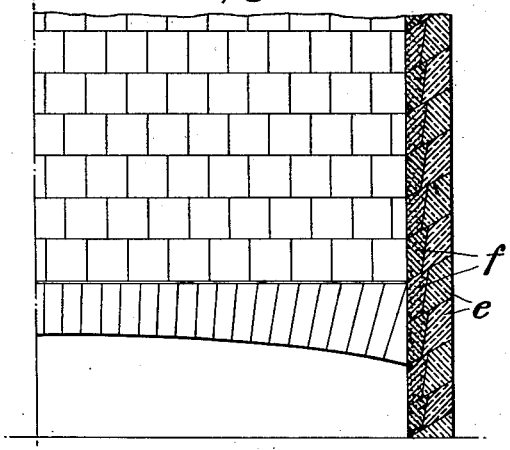
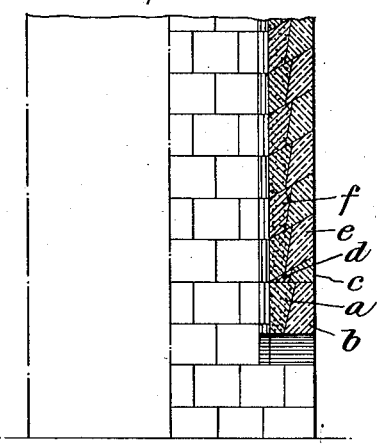
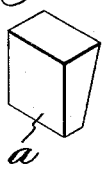
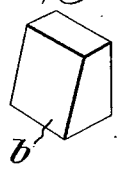
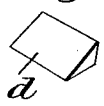
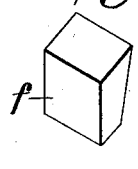
George F. Weaton, Inventor
By Byrnes, Townsend & Potter
Attorneys.

Patented Aug. 14, 1934

1,970,209

UNITED STATES PATENT OFFICE 1,970,209

FURNACE STRUCTURE

George F. Weaton, Beaver, Pa., assignor to St. Joseph Lead Company, New York, N. Y., a corporation of New York Application September 13, 1932, Serial No. 632,994

7 Claims. (Cl. 263—46)

This invention relates to metallurgical furnace structures and to structural elements therefor. It is particularly directed to shaft furnaces for metallurgical smelting operations wherein condensible metal vapors are produced.

A principal object of the invention is the provision of a furnace structure with a refractory lining in which penetration of vaporous products into the horizontal and vertical joints of the structure will be eliminated and in which the lining will be mechanically interlocked with the furnace walls.

I have found that in a metallurgical furnace of the vertical shaft type, wherein metallic vapors are formed, the metallic vapors penetrate into the joints between the structural elements of the furnace and condense therein at some particular critical temperature zone. If the joint be horizontal to the vertical axis of the furnace the condensed metal will not only penetrate into the horizontal joints but will penetrate into the vertical joints as well, solidify in the joints, and ultimately cause destruction of the walls of the furnace. In a furnace of the electrothermic reduction type this penetration of vapors into the joints will cause short-circuiting due to the formation of a metallic conductor in the joints. The passage of the electric current through this conductor, the resistance of which is lower than that of the charge within the furnace, rapidly creates an excess heat, temperatures of 1600° C. having been measured. At about this temperature the refractories become conductive, resulting in a rapid destruction of the refractories.

With the structure described in the present invention these difficulties are eliminated. The metal condensing from the vapor which has penetrated the joints will not penetrate further into the joints, but will flow back into the furnace as it condenses. This results in an increase in the efficiency and usable life of the refractory lining and the furnace structure, eliminates the diversion of electric current and the destructive action due to such diversion, and also tends to eliminate the leakage of gases or vapors out of or of air into the furnace.

For the purpose of illustration the invention will be particularly described in its application to an electrothermic resistance furnace for the smelting of zinc ores, with reference to the accompanying drawings, in which:

Figs. 3 to 10, inclusive, are perspective representations of typical structural elements of the invention as applied to the furnace of Fig. 1. The same reference numerals are applied to identical structural elements in the figures.

Fig. 11 is a partial horizontal section through a rectangular furnace constructed in accordance with the invention;

Fig. 12 is a vertical section on line 12—12 of Fig. 11;

Fig. 13 is a vertical section on line 13—13 of Fig. 12; and

Figure 1:
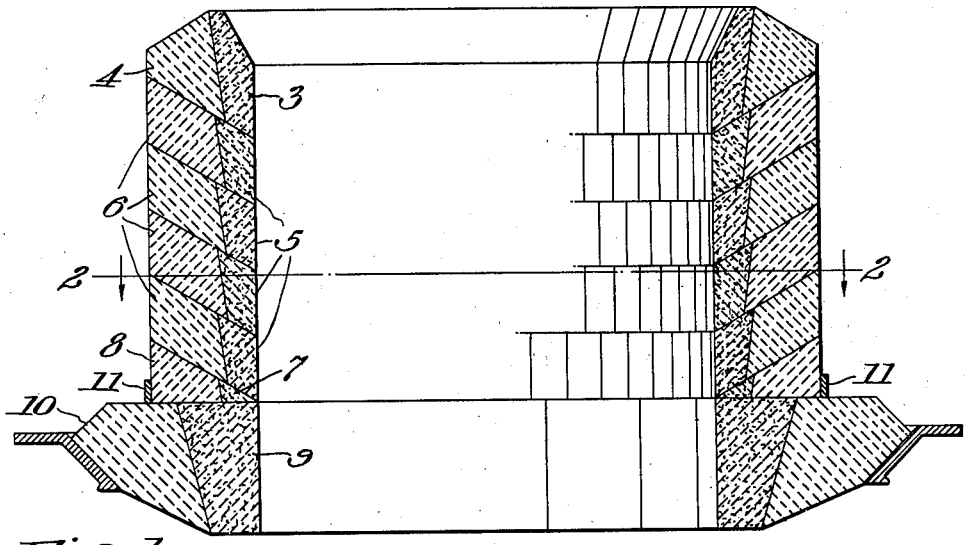
Fig. 1 is a sectional elevation through a portion of an electrothermic resistance shaft furnace embodying the invention.

Figs. 14 to 19 inclusive are perspective representations of typical structural elements of the invention as applied to the furnace structure of Fig. 1.

Figure 2:
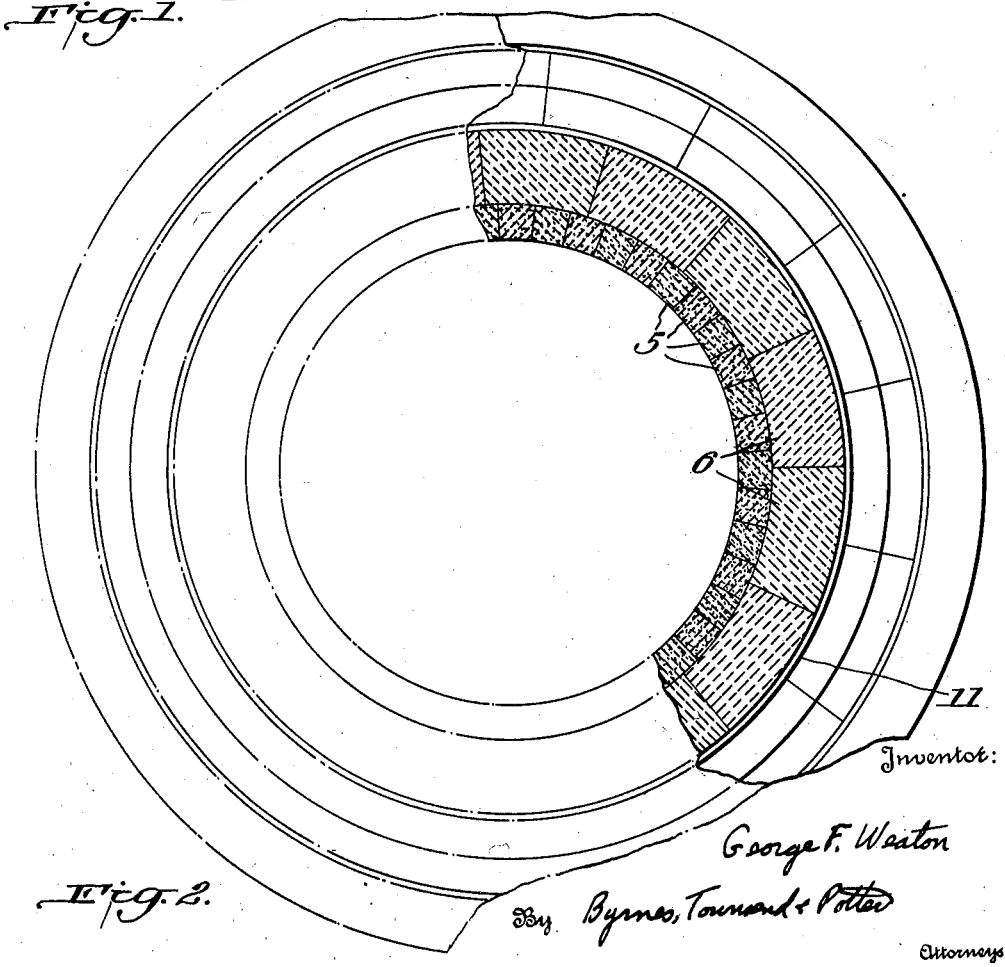
Fig. 2 is a plan in partial section on line 2—2 of Fig. 1.
Figure 3:
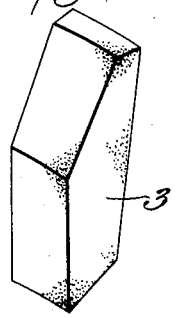
Figure 4:
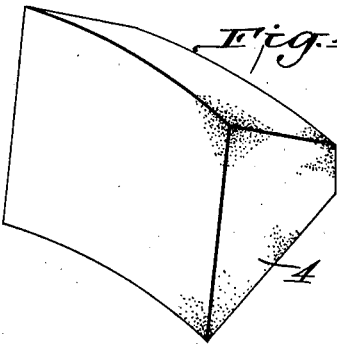
Figure 5:
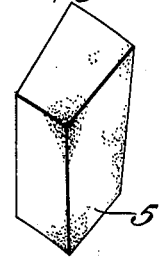
Figure 6:
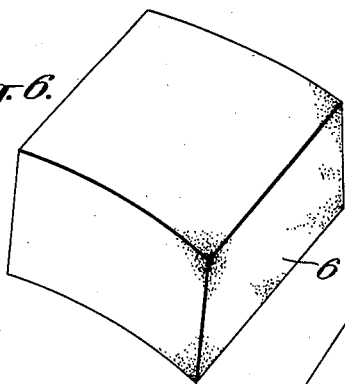
Figure 8:
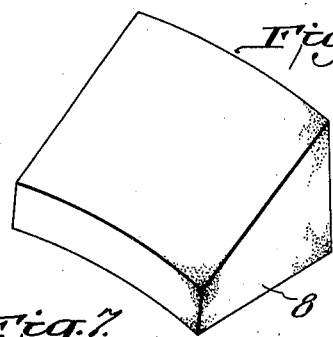
Figure 7:
Figure 9:
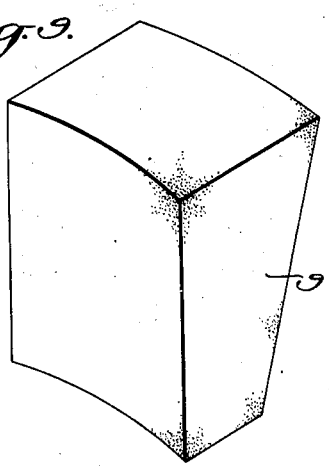
Figure 10:
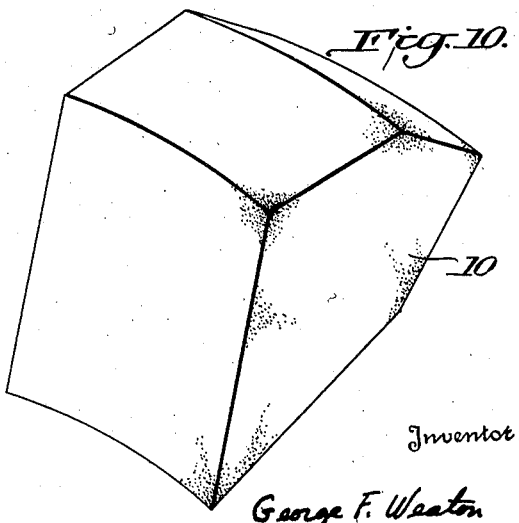

Figs. 1 and 2 represent an independently supportable section of an electrothermic resistance furnace of the type described in U. S. Patent 1,775,591 to Earl C. Gaskill.

The furnace section comprises an outer wall formed of fire-brick structural elements and a refractory lining formed of structural elements of refractory composition, such as silicon carbide or mullite.

The typical structural elements 5 and 6 of which the furnace is composed are sectors of an annulus of trapeziform radial section or, when intended for use in rectangular furnaces, are trapeziform prisms, as shown for example in Figs. 18 and 19.

In the case of elements 5 the inner face is preferably parallel to the vertical center line of the furnace, while the outer face is inclined at an acute angle, typically 8°, from the vertical. The top and bottom faces are frusto-conical and are at an angle of, for example, 30° with the horizontal. For use in rectangular furnaces the inner and outer faces would be plane.

The corresponding structural elements 6 of the outer wall are similar in shape to elements 5, except that in the case of the outer elements the inner face is at an acute angle corresponding to the angle of the outer face of the lining elements.

Elements 7 and 8 serve as a base above the supporting skewback element 10 and provide an inclined base so that the inner and outer faces of elements 5 and 6, respectively, may be parallel with the vertical axis of the furnace.

When structural element 8 is held in place by band 11 all elements above are solidly locked in place—(a) due to the slope of the joints, and (b) due to the breaking of the joint, which will cause each ring to act as a unit. The result is that expansion as the furnace heats causes the elements 5 to thrust outward on the inclined plane, causing the pressure on the vertical joints to increase, thereby decreasing the probabilities of leakage of gas, air or metallic vapors through these joints.

From Figures 11 to 19 of the drawings illustrating the embodiment of the invention in a rectangular furnace it will be seen that the principles of the invention described in the foregoing are applicable to rectangular structures and that in such structures they offer similar advantages to those already described for curvilinear structures.

In the construction of furnaces in accordance with the invention it is desirable to break the vertical joints both vertically and horizontally.

It will be obvious from the foregoing disclosure that the invention is not limited to the particular embodiment illustrated, but that it broadly embraces a masonry furnace structure comprising structural elements forming a shell and a lining wherein both the joints between superimposed structural elements and the joints between the elements of the shell and the elements of the lining slope downward toward the interior of said furnace. The invention also comprises the novel structural elements characterized by their trapeziform section.

I claim:

1. A furnace structure comprising structural elements forming an outer shell and a lining to said shell wherein the joints between said structural elements slope downward toward the interior of the furnace.

2. A furnace structure comprising structural elements forming an outer shell and a lining to said shell wherein the joints between superimposed courses of structural elements and the joints between the shell and the lining slope downward toward the interior of the furnace.

3. A furnace structure comprising masonry structural elements forming an outer shell and refractory structural elements forming a lining to said shell, wherein the joints between superimposed courses of structural elements and the joints between the shell and the lining slope downward toward the interior of the furnace.

4. A furnace structure comprising structural elements forming an outer shell and a lining to said shell, said structural elements being of trapeziform vertical section whereby said shell and said lining are interlocked and the joints between superimposed courses of structural elements and the joints between the shell and the lining slope downward toward the interior of the furnace.

5. A composite wall structure having a pair of parallel vertical surfaces comprising a plurality of vertical layers, each consisting of a plurality of superimposed courses of structural elements the internal joints between said vertical layers sloping toward one of the vertical surfaces of said wall structure.

6. A composite wall structure having a pair of parallel vertical surfaces comprising a plurality of vertical layers, each consisting of a plurality of superimposed courses of structural elements the joints between superimposed courses in said structure as well as the joints between said vertical layers sloping toward one of the vertical surfaces of said wall structure.

7. A furnace structure comprising structural elements forming an outer shell and a lining to said shell concentric therewith wherein the joints between superimposed courses of structural elements and the joints between the shell and the lining slope downward toward the interior of the furnace.

GEORGE F. WEATON.